United States Patent [19]

Paquette et al.

[11] Patent Number: 4,878,583

[45] Date of Patent: Nov. 7, 1989

[54] STORING AND DISPENSING SYSTEM

[75] Inventors: Edmund T. Paquette, Shrewsbury; John W. Beam, Princeton, both of Mass.

[73] Assignee: Wright Line, Inc., Worcester, Mass.

[21] Appl. No.: 127,797

[22] Filed: Dec. 2, 1987

[51] Int. Cl.⁴ ............................................. A47G 19/08
[52] U.S. Cl. ......................................... 211/41; 312/8; 211/94; 211/162
[58] Field of Search ............... 211/41, 40, 162, 126, 211/133, 94, 81; 312/8, 9, 10, 12, 13, 14; 206/387

[56] References Cited

U.S. PATENT DOCUMENTS 3,452,878  7/1969  Smith .
3,613,895 10/1971  Larkin ..................................... 312/8
4,182,538  1/1980  Armistead ............................. 312/12
4,573,589  3/1986  Atkinson ............................... 211/41
4,630,737 12/1986  King ..................................... 211/40
4,651,882  3/1987  Wright et al. ......................... 211/40
4,668,027  5/1987  Wright et al. ......................... 312/13

Primary Examiner—Sarah A. Lechok
Attorney, Agent, or Firm—Hamilton, Brook, Smith & Reynolds

[57] ABSTRACT

A cell for receiving, storing and dispensing an object having a bottom (18), a side wall (30), a rear wall (32), a discharge end (40) opposite the rear wall and a ridge at the discharge end of the cell. A central, elongate, cantilever area (50) is formed in the bottom of the cell which supports an object when the remainder of the cell has been pivoted downwardly and the cell has been partially ejected by the rear wall.

17 Claims, 5 Drawing Sheets

STORING AND DISPENSING SYSTEM

FIELD OF THE INVENTION

This invention relates to storing and dispensing systems in general, and more specifically, to a system employing cells for storing and dispensing objects such as magnetic tape cartridges.

BACKGROUND OF THE INVENTION

For years the accepted state-of-the-art means for supplying digital magnetic tape to data processors and other users was the familiar 10½ inch reel of ferric oxide magnetic tape. The development of the IBM 3480 Magnetic Tape Subsystem which utilizes a recording medium of chromium-dioxide magnetic particles on tape contained within compact, easy to handle cartridges, is rapidly making the 10½ inch tape reels obsolete. Not only is the chromium-dioxide magnetic tape technologically better than ferric oxide tape, but being stored in specially designed cartridges which are about 4 inches by 5 inches in size, compared with the 10½ inch reels, has resulted in substantial space saving to users.

Libraries for tape cartridges are available in the form of conventional stationary pigeon hole stacks into which individual cartridges are slid and then removed for usage. Portable carts with pigeon holes are also available to transport a number of cartridges from the stacks to data processing equipment.

In commonly owned U.S. Pat. Nos. 4,630,737, 4,668,027 and 4,651,882, there are disclosed systems wherein there are a plurality of rows of pivotal storage cells within a frame or library stack. Each cell has a cartridge-discharge end and a rear wall opposite each other. A support is located beneath each row of cells and extends horizontally across the frame or stack. Pivot means are located intermediate the ends of each cell to permit it to pivot on the support means relative to the horizontal. In one system the center of gravity of the cell is located closer to the rear wall than to the cartridge-discharge end so that the bottom of the rear end of the cell normally occupies a lower position relative to the horizontal than the cartridge-discharge end, that is, the cell and the cartridge it contains tilts downwardly to the rear of the supporting means.

In another system, the center of gravity of the cell is closer to the cartridge-discharge end.

To remove a cartridge from the cell in either system, the front or cartridge-discharge end is manually tipped downwardly to expose the upper front portion of the cartridge whereby it may be picked out of the cell. After the cartridge is removed, the weight of the cell tips it to the position it occupied when it contained the cartridge.

There is an obvious advantage to be gained if a system of the type described above had a cell which, if not immediately removed, would not only expose a cartridge for immediate removal, but leave it in a position where it can be removed at a later date.

Thus, it is an object of this invention to provide a storing and dispensing cell, which, upon the application of finger pressure, moves a stored object partially out of the cell for immediate removal at a later time.

Another object of this invention is to provide a system for storing and dispensing objects employing a plurality of rows of cells in stacks whereby any number of objects may be successfully placed in position for removal by an operator walking down the stack by depressing one cell after another. He may either remove each object immediately or return later to do so or delegate removal to another person.

SUMMARY OF THE INVENTION

The invention resides in a system for storing and dispensing objects such as magnetic tape cartridges in which there are a plurality of storage cells arranged inside by side relation in rows. Each of the cells has a bottom, a side wall, a rear wall and a discharge end opposite the rear wall. A ridge is located at the discharge end of the cell which extends upwardly from the bottom across the front of the cell. It is engageable with the object when the object resides or is positioned on the bottom of the cell between the ridge and the rear wall.

There is a central, elongated, cantilever area formed in the bottom of each cell. The cell itself is mounted for pivotal movement relative to the horizontal. Means are provided for restraining the central cantilever area from pivotally moving whereby it is a permanent horizontal fixed support for the cell.

When the discharge end of the cell is pivoted downwardly, the object remains on the central, cantilever area, however, the ridge moves below the bottom of the object and the rear wall of the cell urges the object along the central area outwardly of the cell into a position where it may grapsed for removal. The cartridge may be immediately removed from the cell or remain in the forward or discharge position for removal and collection at a subsequent date.

There are vertical, reinforcing means attached to the central cantilever area of the cell which is engagable with the mounting means to restrain the central area from pivoting. The reinforcing means also adds strength and rigidity to the bottom of the cell.

The central cantilever area formed in the bottom of the cell is defined by a substantially U-shaped cutout with the open end of the U pointing toward the discharge end of the cell.

The closed end of the U-shaped configuration terminates at a location which is spaced from the discharge end of the cell.

The cell has pivot means which extend downwardly from the bottom into engagement with the mounting means, and the central U-shaped area is located between the pivot means and the discharge end of the cell.

The rear wall of the cell is substantially higher than the side wall in order that it be able to engage the cartridge and urge it forwardly over the ridge when the cell is pressed downwardly.

The restraining means comprises a vertical web which is attached to the central area of the cell and which in engagable with the mounting means.

The above and other features of the invention including various and novel details of construction and combinations of parts will now be more particularly described with reference to the accompanying drawings and pointed out in the claims. It will be understood that the particular storing and dispensing system embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
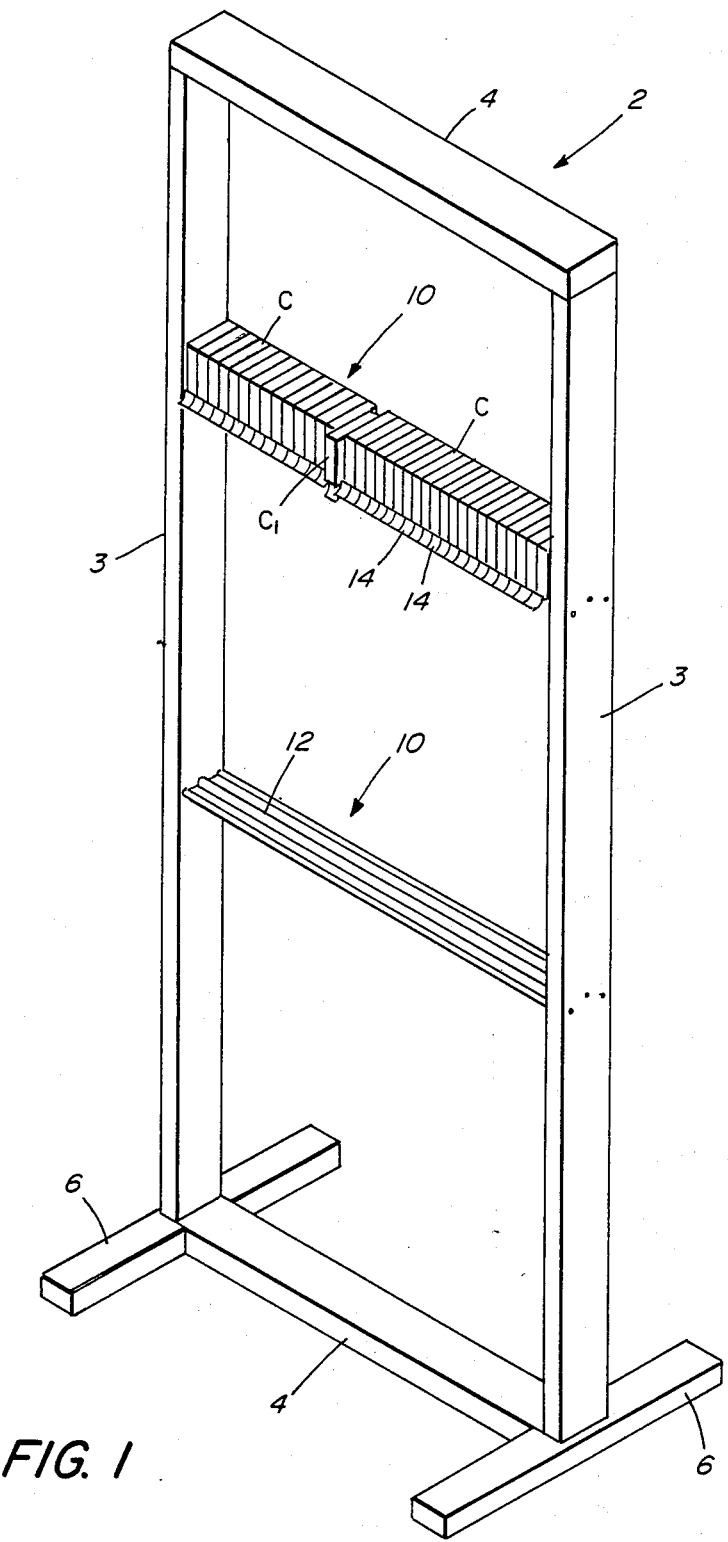
FIG. 1 is a perspective view of a library stack for storing and dispensing articles such as magnetic tape cartridges embodying features of the present invention.
Figure 2:
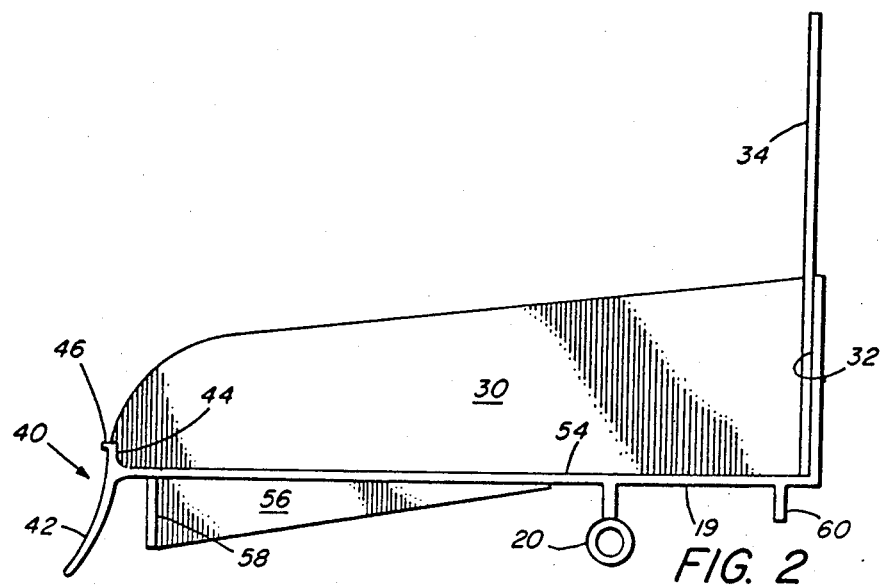
FIG. 2 is a side view of a cartridge storing and dispensing cell made in accordance with the present invention.

In FIG. 1 an illustrative library stack is shown which comprises a frame generally designated 2 which includes upright members 3, horizontal members 4, and supporting feet 6. The frame is also illustrative of a free standing member or even the frame portions of a mobile cart, which may be employed for transporting cartridges from the library to data processing equipment which will utilize the cartridges.

The cartridges or other equivalent articles are stored, side-by-side, in cells 14. The illustrative stack includes rows 10, (only two of which are seen in FIG. 1) which includes support means 12 for mounting cells, generally designated 14. The cells 14 are pivotal, relative to the horizontal, on the support means 12. It will be understood that there are many parallel rows of support means, even though only one complete row with cells and one support means without cells are shown in FIG. 1.

One of the cartridges designated C' is shown In FIG. 1 extended to a position where it may be removed from the cell. In the extended position it may be either removed immediately after it has been extended or remain extended until it and/or others, selected along with it, are subsequently removed.

Referring next to FIGS. 2 through 5, an illustrative cartridge storing and dispensing cell 14 will now be described in detail. The cell which may be made of high impact styrene, or other like material, has a flat cartirdge engaging bottom 18, an under surface 19 from which projects a male pivot member 20 which is engagable in a mating female socket 22 formed in the support means 12 (see FIGS. 6 to 8). The support means 12 is not unlike those shown in the commonly owned U.S. Pat. Nos. 4,630,737, 4,668,027 and 4,651,882. A ridge 24 (FIGS. 6 to 8) extends lengthwise of the support means 12 and will be referred to in greater detail hereinafter.

The cell 14 includes a vertical side wall 30, a rear wall 32 and an upstanding rear wall extension 34 secured to the rear wall 32 and abutting the side wall 30.

The discharge end of the cell, generally designated 40, is opposite the rear wall 32 and includes an arcuate, downwardly extending, pressure receiving portion 42, which is joined to the bottom 18. Extending upwardly from the bottom is a ridge 44 which has a flat upper surface 46.

Figure 3:
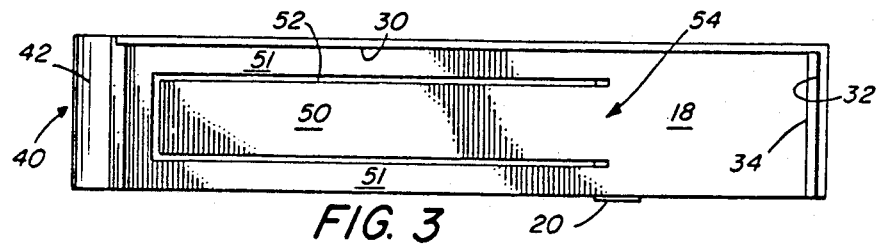
FIG. 3 is a top view thereof.
Figure 5:
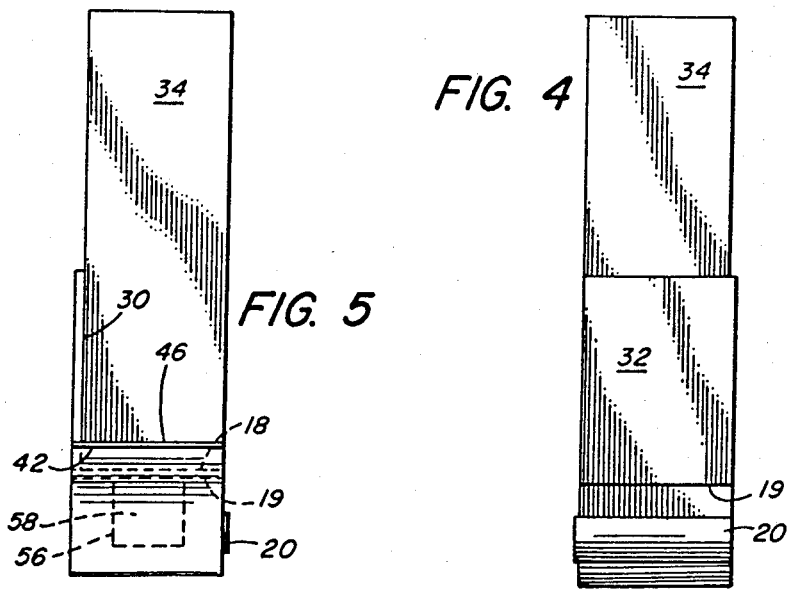
FIG. 5 is a front view thereof.
Figure 4:
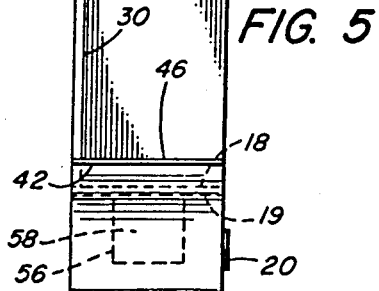
FIG. 4 is a rear view thereof.

As best seen in FIG. 3, a central, elongate, cantilever area 50 is formed in the bottom 18. It is defined by a substantially U-shaped cut 52 with the closed end of the U pointing toward the discharge end 40 of the cell.

The open end of the U terminates at a location 54 which is spaced from the rear wall 32 and close to the pivot means 20, but somewhat nearer to the discharge end.

A triangular shaped plate 56 extends downwardly from the central portion 50 and intersects a rectangular plate 58 which extends downwardly from the closed end of the central portion 50. The combination of the structure 56 and 58 adds rigidity to the portion 50 and serves as a restraining means to prevent the central portion from pivoting when the remainder of the cell is pivoted as will become more apparent hereinafter.

Figure 6:
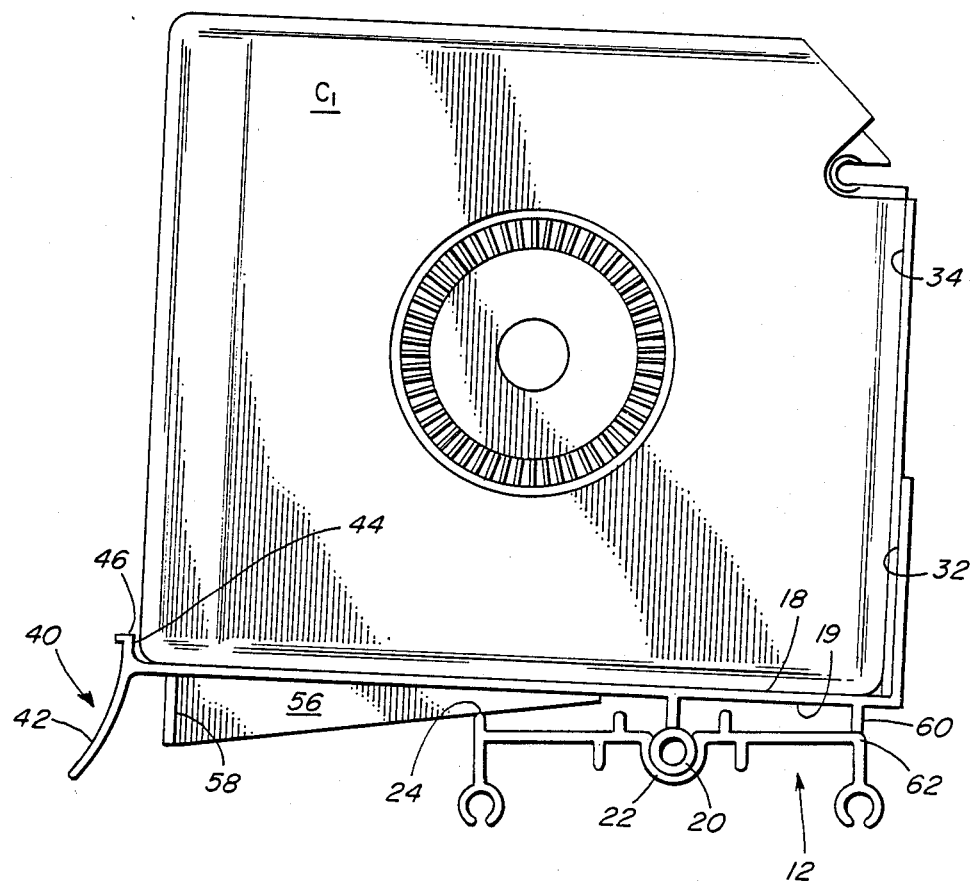
FIG. 6 is a side view of a cell in which a magnetic tape cartridge is located in the storing position.

As will be seen in FIG. 6, a cartridge designated $C_1$, which corresponds to the cartridge shown in FIG. 1 in the ejected position, rests upon the bottom 18 of the cell 14 inwardly of the ridge 44 and actually or substantially abutting the rear wall extension 34. At this time the restricting means, i.e., the triangular shape member 56, rests upon the ridge 24 of the support means 12. Each cartridge C in its cell 14 occupies the position equivalent to that of cartridge $C_1$ when stored in the shelf or rack 2. A projection 60 extending downwardly from the bottom surface 19 of the cell 14, rests upon a rearward portion 62 of the support means 12.

Figure 7:
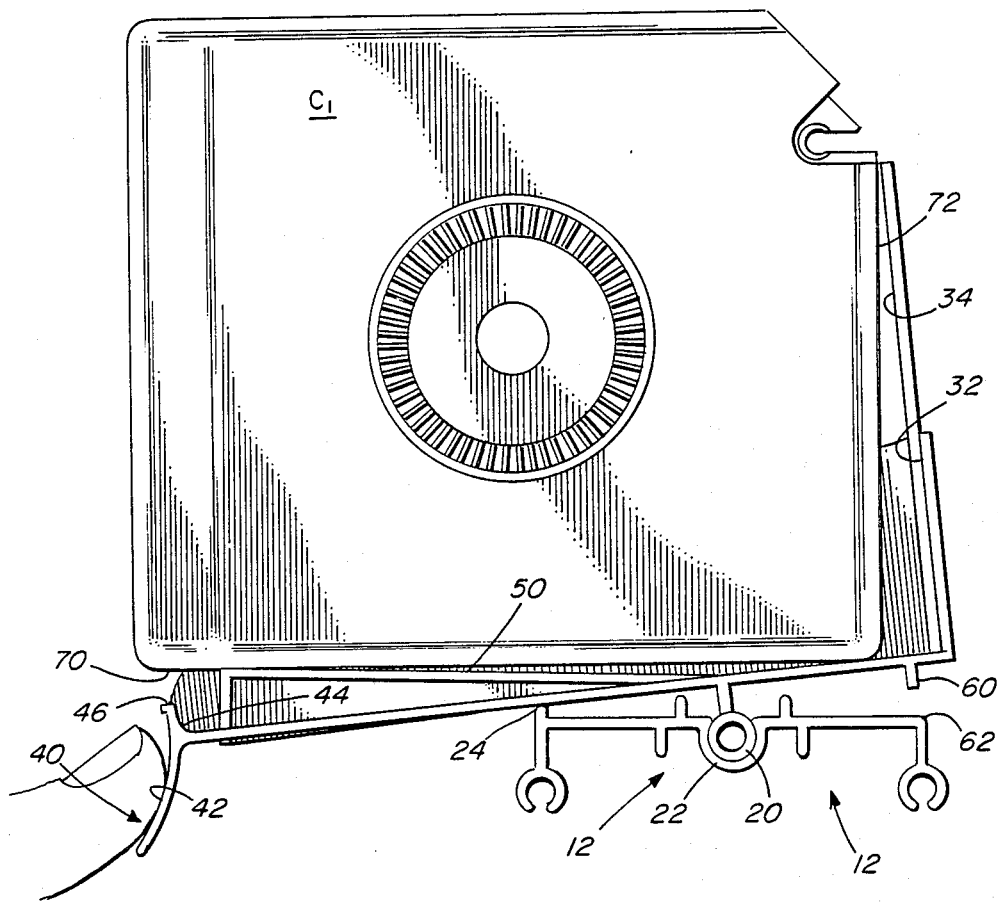
FIG. 7 is a view similar to FIG. 6 in which the cartridge is in the process of being moved out of the cell by manual pressure being applied to the cell.

Referring next to FIG. 7, when it is desired to remove an object such as cartridge $C_1$ from a cell, the arcuate portion 42 is depressed, as for example, by a person's finger, This causes the cell 14 to pivot downwardly at the discharge end with the pivot member 20 rotating within the socket 22 of the support means 12. The central, elongate, cantilever area 50 does not pivot but remains stationary, its bottom resting on the ridge 24. Flexing takes place in the area 54 (FIGS. 2 and 3), where the open end of the U-shaped, cantilever portion terminates. The cartridge $C_1$ rests on the surface 46 of the ridge 44 has moved below the bottom 70 of the cartridge $C_1$. Simultaneously, the cartridge is moved from right to left as viewed in FIG. 7 by the extension 34 of the back wall 32 pivoting toward and bearing against the rear portion 72 of the cartridge. This slides the cartridge forwardly of the cell (i.e., to the left), the cartridge sliding on the surface 50.

At this time the cartridge may be physically grasped and removed or it may be allowed to remain where it is.

Figure 8:
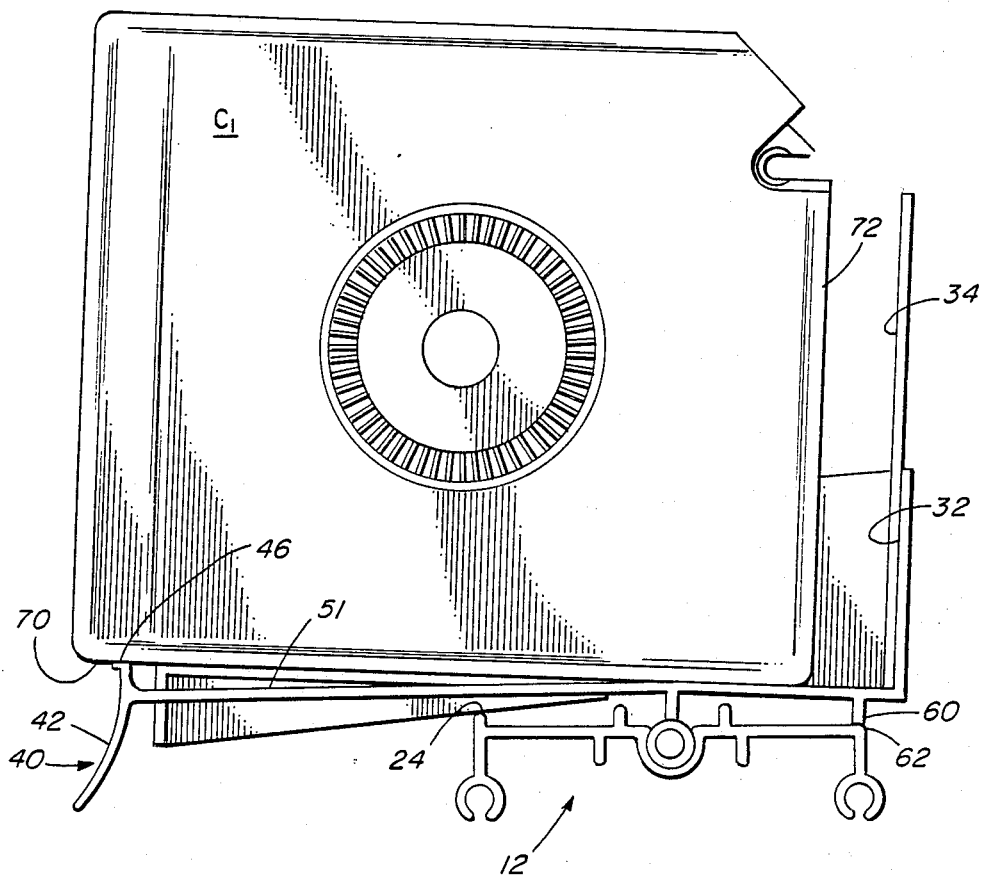
FIG. 8 is a view of the cell after the cartridge has been moved outwardly but before it has been physically removed from the cell.

When pressure is removed from the pressure receiving member 42, the cell will again move upwardly until the top of the ridge 46 abuts the bottom of the cartridge 70 as shown in FIG. 8. At this time the rear portion of the cartridge 72 has been moved to the left away from the rear wall extension 34 and the cartridge $C_1$ is then supported on the bottom 18 of the cell, as well as its central, centilever portion 50. Those portions 51 of the cell bottom which are lateral of the central portion 50 remains below the bottom of the cartridge.

The cartridge $C_1$ and any other cartridges which have been moved ouwardly to the extended position may then be removed from the racks for processing.

Upon removal, the cell returns to the position shown in FIG. 6.

To replace a cartridge, it is merely placed on the cell with the rear surface 72 abutting or close to the rear wall extension 34 and with the front of the cell behind the ridge 44.

We claim:

1. A system for storing and dispensing objects such as magnetic tape cartridges comprising:
   a storage cell for receiving an object having:
   a bottom,
   a rear wall,
   a discharge end opposite the rear wall,
   a ridge at the discharge end of the cell extending upwardly from the bottom across the cell and engagable with the object residing on the bottom of the cell,
   a central, elongate, cantilever area formed in the bottom,
   means mounting the cell for pivotal movement relative to the horizontal,
   means for restraining the central area from pivotal movement,
   whereby when the discharge end of the cell is pivoted downwardly, the object remains on the central area, the ridge moves below the object and the rear wall urges the object along the central area outwardly of the cell into a position where it may be grasped for removal.

2. A system for storing and dispensing objects such as magnetic tape cartridges comprising:
   a plurality of storage cells for receiving and storing objects, the cells being aligned in a row in side by side relationship,
   each cell having:
   a bottom,
   a rear wall,
   a discharge end opposite the rear wall,
   a ridge at the discharge end of the cell extending upwardly from the bottom across the cell and engagable with the object residing on the bottom of the cell,
   a central, elongate cantilever area formed in the bottom,
   means mounting each cell for pivotal movement relative to the horizontal,
   means for restraining the central area from pivotal movement,
   whereby when the discharge end of a cell is pivoted downwardly, the object remains on the central area of the bottom, the ridge moves below the object and the rear wall urges the object along the central portion outwardly of the cell into a position where it may be grasped for removal.

3. A system for storing and dispensing objects such as magnetic tape cartridges comprising:
   a storage cell for receiving an object having:
   a bottom,
   a rear wall,
   a discharge end opposite the rear wall,
   a ridge at the discharge end of the cell extending upwardly from the bottom across the cell and engagable with the object residing on the bottom of the cell,
   a central, elongate cantilever area formed in the bottom,
   means mounting the cell for pivotal movement relative to the horizontal,
   vertical reinforcing means attached to the central area and engageable with the mounting means to restrain the central area from pivoting,
   whereby when the discharge end of the cell is pivoted downwardly, the object remains on the central area of the bottom, the ridge moves below the object and the rear wall urges the object along the central portion outwardly of the cell into a position where it may be grasped for removal.

4. Storing and dispensing system according to claim 1 wherein the central area is defined by a substantially U-shaped cut with the closed end of the U pointing toward the discharge end of the cell.

5. Storing and dispensing system according to claim 2 wherein the central area is defined by a substantially U-shaped cut with the closed end of the U pointing toward the discharge end of the cell.

6. Storing and dispensing system according to claim 3 wherein the central area is defined by a substantially U-shaped cut with the closed end of the U pointing toward the discharge end of the cell.

7. Storing and dispensing sytem according to claim 1 wherein the central area is substantially U-shape in configuration with the open end of the U terminating at a location spaced from the rear wall of the cell.

8. Storing and dispensing system according to claim 2 wherein the central area is substantially U-shape in configuration with the open end of the U terminating at a location spaced from the rear wall of the cell.

9. Storing and dispensing sytem according to claim 3 wherein the central area is substantially U-shape in configuration with the open end of the U terminating at a location spaced from the rear wall of the cell.

10. Storing and dispensing system according to claim 1 wherein the cell has pivot means extending downwardly from the bottom into engagement with the mounting means and the central area is located between the pivot means and the discharge end of the cell.

11. Storing and dispensing system according to claim 2 wherein the cell has pivot means extending downwardly from the bottom into engagement with the mounting means and the central area is located between the pivot means and the discharge end of the cell.

12. Storing and dispensing system according to claim 3 wherein the cell has pivot means extending downwardly from the bottom into engagement with the mounting means and the central area is located between the pivot means and the discharge end of the cell.

13. Storing and dispensing system according to claim 1 wherein the cell has a side wall and the rear wall is substantially higher than the side wall.

14. Storing and dispensing system according to claim 2 wherein the cell has a side wall and the rear wall is substantially higher than the side wall.

15. Storing and dispensing system according to claim 3 wherein the cell has a side wall and the rear wall is substantially higher than the side wall.

16. System for storing and dispensing objects according to claim 1 wherein the restraining means comprising a vertical web attached to the central area and which is engageable with the mounting means.

17. System for storing and dispensing objects according to claim 2 wherein the restraining means comprising a vertical web attached to the central area and which is engageable with the mounting means.

* * * * *